Aug. 2, 1960 C. A. LEVINE ET AL 2,947,774
PREPARATION OF ALKYL PYROPHOSPHATE EXTRACTANTS
Filed April 25, 1956
Fig. 1.
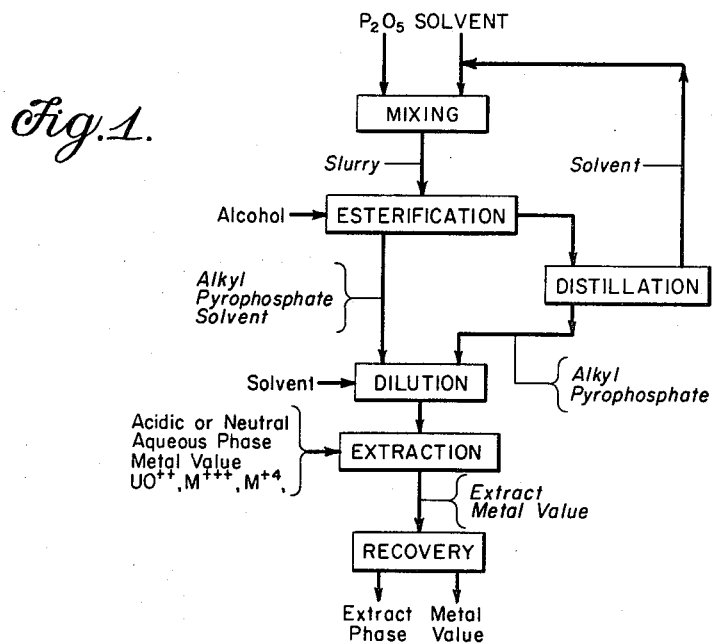
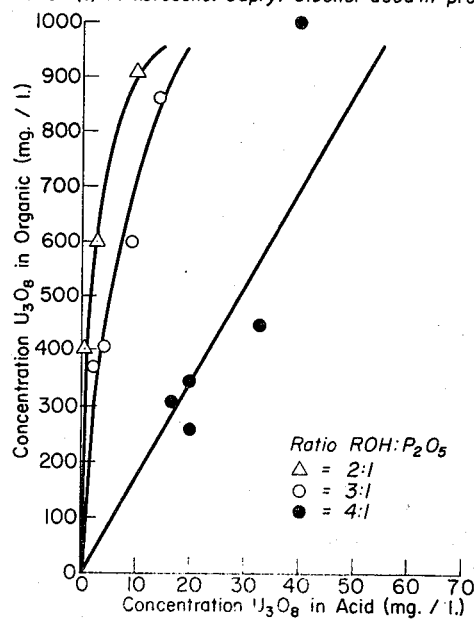
Fig. 2.
INVENTORS.
CHARLES A. LEVINE
WILLIAM E. SKIENS
BY
Roland A. Anderson
ATTORNEY.

United States Patent Office
2,947,774
Patented Aug. 2, 1960

2,947,774
PREPARATION OF ALKYL PYROPHOSPHATE EXTRACTANTS

Charles A. Levine, Concord, Calif., William E. Skiens, Seattle, Wash., and George R. Moore, Oakland, Calif., assignors, by mesne assignments, to the United States of America as represented by the United States Atomic Energy Commission Filed Apr. 25, 1956, Ser. No. 580,670

4 Claims. (Cl. 260—461)

The present invention relates in general to the preparation of the alkyl derivatives of pyrophosphoric acid and, more particularly, to the preparation of such materials in a form exhibiting very superior extraction characteristics in solvent extraction processes for recovering and purifying metal values.

In the copending application of Ray S. Long, Serial No. 491,798, filed March 2, 1955, now United States Patent No. 2,866,680, issued December 30, 1958, there is disclosed and claimed a process utilizing various alkyl pyrophosphates as extractants for recovering metal values. Moreover, a brief description of the process of the present invention is disclosed therein.

In practicing the recovery process of the aforesaid application, there is first produced a neutral or mineral acidic solution of the metal values to be recovered, including impurities, and the desired value is preferentially extracted by contact with an organic phase including an alkyl pyrophosphate and an organic solvent-diluent. The extractive selectivity of such organic extractant phase, relevant to the pyrophosphate extractant, follows certain general rules which is correlated with the degree of ionization of the metal value ions in the aqueous phase. Monopositive ions such as $Na^+$, $K^+$, etc. do not extract to an appreciable degree while dipositive ions including those of the second group of the periodic system, e.g., $Ca^{++}$, $Mg^{++}$, as well as $Fe^{++}$ and similar dipositive ions extract to only a limited extent. Tripositive ions of higher atomic weight such as $Fe^{+++}$ and those of the lanthanide and actinide elements including cerium are extracted with high efficiency while lower atomic weight tripositive ions such as $Al^{+++}$ are extracted with lower effectiveness. Tetrapositive ions of heavy metal elements, e.g., $Th^{+4}$, $U^{+4}$ and other at least as highly charged ions of the Actinide Series are extracted with the highest of distribution coefficients. Dipositive ions of the uranyl type, $UO_2^{++}$, exhibit anomalous behavior in that very high extraction coefficients are obtained in the above-mentioned process.

Following extraction of the metal value, a variety of procedures may be employed to recover the metal value, especially uranium, from the extract, 20–50% aqueous HF, with or without the addition of concentrated $H_3PO_4$, precipitates the metal value. Alcohol or ammonia added to the extract likewise precipitates the metal value. Concentrated HCl strips uranium from the extract and later the uranium can be recovered from the strip solution by basic precipitation or anionic exchange. Uranium can also be recovered by reduction followed by fluoride precipitation.

We have found that much superior alkyl pyrophosphate extractants can be prepared, for use in such a process, in accordance with a procedure wherein $P_2O_5$ is first slurried in admixture with certain solvents and then an appropriate alcohol is reacted with the slurried $P_2O_5$ under critically controlled conditions. Later, the extractant phase is prepared from the reacted material and employed in the extraction process. Specific proportions of reagents, certain preferred contacting and reaction procedures and close control of other reaction condition parameters are essential for the preparation of the superior extractants as disclosed more fully hereinafter.

It is therefore an object of the invention to provide superior alkyl pyrophosphates for use in metal solvent recovery and purification processes.

Another object of the invention is to provide a process for producing superior alkyl pyrophosphoric acid extractants wherein $P_2O_5$ is slurried with a selected solvent and an alcohol is then reacted therewith.

Still another object of the invention is to provide a process for producing alkyl pyrophosphoric acid extractants wherein $P_2O_5$ in slurried admixture with a selected solvent is reacted with an appropriate alcohol to produce superior alkyl pyrophosphoric acid extractants under controlled temperature conditions.

A further object of the invention is to provide a process for producing alkyl pyrophosphoric acid extractants wherein $P_2O_5$ is slurried in a selected solvent and reacted with critical proportions of an appropriate alcohol under carefully controlled conditions to provide a superior reagent for extracting metal values from neutral or acidic aqueous phases.

Other objects and advantages of the invention will become apparent by consideration of the following description taken in conjunction with the accompanying drawing of which:

Figure 1 is a flow sheet illustrating the process of the invention; and

Figure 2 is a graph showing the effect of variations in the ratios of alcohol to $P_2O_5$, used in the synthesis, on extractions performed with the extractant.

For the purpose of synthesizing an alkyl pyrophosphate extractant in accordance with the invention, there is generally employed a reaction vessel which is equipped with a stirrer, reflux condenser and means for heating and cooling. As the first operation, as indicated in Fig. 1 of the drawing, the reaction vessel is charged with an organic solvent-diluent, e.g., kerosene, benzene or other solvent of the character more fully disclosed hereinafter. Phosphorous pentoxide is then introduced into the solvent and thoroughly dispersed therein, forming a $P_2O_5$, organic-solvent slurry. Best results are obtained if the relative proportions of materials in the slurry correspond to about 100 gm. $P_2O_5$ to 1 liter of solvent. With continuous stirring, the appropriate alcohol is rapidly added to the slurry until a reagent ratio closely approximating 2 moles of alcohol to 1 mole $P_2O_5$ is obtained. An esterification reaction between the alcohol and $P_2O_5$ begins and proceeds with a large exothermic production of heat; however, the temperature must be maintained below a maximum of about 110° C. and, preferably, below 90° C. to insure production of the more effective extractants. Either refluxing of the solvent, addition of more solvent, or vessel cooling is employed to control the temperature below the indicated values.

The esterification reaction is allowed to proceed to completion as indicated by the cessation of heat production and disappearance of solid $P_2O_5$. The resultant alkyl pyrophosphate ester-solvent mixture is immediately cooled and may be further diluted with the identical solvent in the event that the reaction solvent is suitable for use in metal solvent extraction processes as disclosed in the aforesaid copending application. In the event that the reaction solvent is not to be used in the actual extraction process, for economic or process reasons, the reaction solvent is distilled from the alkyl pyrophosphate and the said alkyl pyrophosphate is then diluted with a solvent-diluent of the character described below prior to use in the solvent extraction process.

Various terminologies have conventionally been applied to the general class of compounds to which the extractants of the invention relate including alkyl pyrophosphoric acids, alkyl pyrophosphoric esters, alkyl pyrophosphate, dialkyl derivative of pyrophosphoric acid, etc. In any event superior pyrophosphate extractant compounds, corresponding to the following general structural formula can be prepared by the process of the invention:

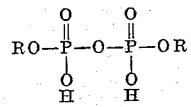

wherein R can be aliphatic, naphthenic or aromatic chain substituents, i.e., pyrophosphoric acid esters of aliphatic, cyclo-alkyl or aromatic alcohols. However, in solvent extraction processes in which the present extractants are employed for the recovery and purification of metal values the substituents, the R radicals in the above formula, are preferably derived from aliphatic alcohols having from 4 to 17 carbon atoms. The normal linear chain, isomeric and branched chain configurations are all suitable. More specifically, these R groups may be butyl, amyl, hexyl, heptyl, octyl, nonyl, decyl, et. seq. through heptadecyl and isomers thereof and either alone or as mixed derivatives, including cyclo-alkyls. Any of the foregoing are usually suitable since solubility in the aqueous phase is low, solubility in the organic phase is high and excessive emulsification or other difficulties do not occur. It has been observed, in many cases, that the extraction efficiency increases with increased chain length, at least to the decyl derivatives; however, the increase in the extraction efficiency above octyl is rather small. Therefore, the dioctyl, dinonyl, and didecyl pyrophosphate esters are most extensively employed in practice; however, it is to be understood that the other extractants described above may likewise be employed and can be prepared in accordance with the present invention. The name of the latter extractants may be abbreviated O.P.P.A., N.P.P.A., and D.P.P.A., respectively. Relating to the present invention, the term alkyl pyrophosphatic extractant defines a group of select substances, i.e., certain alkyl pyrophosphates which, when employed as an appropriate organic phase, have the necessary physical and chemical characteristics required for the extraction of metal values from an aqueous phase. It has been found that the said alkyl pyrophosphates gradually lose their extractive power with time; however, even after extended periods of storage, extractants prepared in accordance with the invention are generally quite superior to those prepared by conventional processes. It has also been found that by refrigerating the prepared pyrophosphate esters, the above-mentioned loss in extractive efficiency is appreciably slowed. Therefore, the said alkyl pyrophosphate esters should be utilized in the extractive process as soon as possible after preparation, i.e., within about 8 hours or, alternatively, be held under refrigeration, i.e., below about 10° C., for several days, by which means the highest efficiency of the said pyrophosphate esters will be realized.

Kerosene, Stoddard and similar petroleum derived solvents have been found to be excellent for use as diluents in the preparation of these alkyl pyrophosphate esters, especially when a similar material is to be utilized as the diluent in the extractive process. Such similar petroleum products include diesel oil, aromatic oils, distillates and petroleum and paint solvents. Benzene, chlorobenzene, toluene, hexane, halogenated aliphatic hydrocarbons and ethers are also suitable with the selection of any particular solvent being made generally on the basis of economic considerations. In view of the diverse nature of the aforesaid solvents, it will be apparent that materials other than those specified will also be found suitable. In general, the characteristics of the solvent-diluent are not critical, although particular solvents will be found to possess advantages for certain preparations, e.g., a solvent with a low boiling point, such as ethers, hexane, etc., may be utilized to maintain a low reaction temperature by refluxing as noted above.

In producing the said alkyl pyrophosphate extractants, the superior products are obtained only by careful control of the proportion of reagents, the temperature of reaction and with a rapid addition rate for the reacting alcohol. We have found that the amount of $P_2O_5$, when slurried in kerosene or other similar organic solvent, must be such that when it is treated with an appropriate alcohol as described above, the final concentration of the pyrophosphate in the solvent is below about 30%.

The use of such organic solvents in the reaction process can serve several other useful purposes; namely, through the proper dilution of the $P_2O_5$ in the organic diluent, the temperature during the reaction of the $P_2O_5$-diluent slurry with the alcohol will not exceed the specified maximum temperatures in order to obtain an extractant with superior extractive efficiency. Another advantage accruing through the use of such diluents during the reaction is that the reaction mixture may be further diluted with the identical solvent to the actual concentration used in the solvent extraction process thus eliminating usual steps required to purify and redissolve the alkyl pyrophosphoric ester with possible degradation of the extractant.

We have further found that the superior alkyl pyrophosphate is best obtained by carefully controlling the molar ratios of the alcohol to the $P_2O_5$. The optimum alcohol to $P_2O_5$ molar ratio has been found to be very nearly 2:1, providing that the reactants are stirred together for a period of time sufficient to allow complete solution of the $P_2O_5$. The quite critical effect of variations in the ratio of alcohol to $P_2O_5$ is clearly demonstrated by extraction results such as those illustrated in Fig. 2 of the drawing. These results were obtained utilizing an alkyl pyrophosphate extractant prepared from capryl alcohol as described more fully in following examples. Briefly, the extractant was prepared as a concentrated solution and then diluted to a 1% solution in kerosene and employed, in various phase ratios, aqueous to organic, to extract uranium from a reduced 30% commercial phosphoric acid. When insufficient time is allowed for stirring, and especially if the alcohol is added before the $P_2O_5$, an insoluble gummy mass will result. This insoluble mass is thought to consist of entrained organic diluent and polymers of the alkyl pyrophosphoric acid.

Following appropriate dilution the reaction mixture, obtained in the foregoing, is employed in the extraction process. Concentrations of extractant in the diluent can range from about 0.05 N to pure extractant insofar as occurrence of extraction phenomena alone is concerned. However, from the standpoint of practical operations, concentrations in the range of about 0.10 to 20% by weight represent reasonable operating limits and are therefore preferred. With high concentrations of the extractant in the diluent, the high viscosity of the extractant phase makes handling and contacting operations difficult, if not impossible. Also, losses of the extractant into the aqueous phase become exorbitant and difficulties are experienced with emulsification, which causes losses during phase separation.

The aqueous phase will generally comprise a mineral acidic or neutral aqueous, e.g., a commercial phosphoric acid solution of the metal value, for example, uranium, to be recovered. Reduction of such solution placing the U in the $U^{+4}$ state facilitates extraction thereof. Contact of the extractant phase with the aqueous can be accomplished in a great many types of apparatus and in either batch or continuous fashion and usually with phase ratios of 1:1 to 20:1 aqueous to organic. Following separation of the phases the uranium can be recovered from the extract as described above.

The compounds prepared in accordance with the invention are also ideal intermediates in the production of other alkyl phosphatic compounds. They are especially valuable as intermediates for producing alkyl o-phosphoric acid derivatives in a process which involves the hydrolysis of the alkyl pyrophosphatic materials under critical conditions and through the mediation of hydrochloric acid in an improved process which is not a part of the present invention.

Specific details of the process for preparing the alkyl pyrophosphate extractions will become apparent by consideration of the following examples:

Example I 141 gm. of $P_2O_5$ was slurried in 1.41 liters of kerosene. While agitating the slurry vigorously, 272 gm. of 95% capryl alcohol (2:1 mole ratio of alcohol to $P_2O_5$) was added rapidly. After ½ hour agitation, the reaction mixture was diluted to 2 liters and then mixed with additional kerosene to form an extractant phase.

Example II

A comprehensive series of alkyl pyrophosphates was prepared by the preferred method of the invention, using the following named alcohols: butanol-1, pentanol-3, hexanol-1, heptanol-3, octanol-1, octanol-2, 2,6-dimethyl heptanol-4, and decanol-1, as follows: $P_2O_5$ was slurried in a concentration of about 0.1 gm. per ml., $P_2O_5$ to solvent, in either benzene or kerosene, as shown in the following table. The particular alcohol was then rapidly added to the stirred slurry in the proportion of 2 moles of alcohol to 1 mole of $P_2O_5$. The mixture was then stirred until the $P_2O_5$ had completely reacted with the alcohol while the temperature was kept below 110° C. The reaction mixture was then further diluted with either benzene or kerosene as appropriate, to a concentration of 1% alkyl pyrophosphate by volume. In order to determine the uranium extraction efficiency of the alkyl pyrophosphates, the diluted solutions were equiliberated with reduced 30% commercial phosphoric acid closely paralleling batch operation practice of the process disclosed in the aforesaid copending application and extraction coefficients were determined.

| Alcohols used in Prep. Dialkyl Pyrophosphates | Solvent | Commercial Phosphoric Acid A | | Commercial Phosphoric Acid B | |
|---|---|---|---|---|---|
| | | e.m.f. Volts | Extraction Coefficient | e.m.f. Volts | Extraction Coefficient |
| Butanol-1 | Benzene | +0.140 | 9.0 | +0.160 | 8 |
| Pentanol-3 | Benzene | +0.223 | 21 | +0.213 | 25 |
| Hexanol-1 | Benzene | +0.160 | 120 | +0.180 | 153 |
| Heptanol-3 | Benzene | +0.130 | 190 | +0.152 | 127 |
| Octanol-1 | Kerosene | +0.130 | 234 | +0.152 | 257 |
| Octanol-2 | Kerosene | +0.130 | 234 | +0.152 | 248 |
| | Benzene | +0.130 | 142 | | |
| 2,6 Dimethyl Heptanol-4 | Kerosene | +0.130 | 90 | +0.152 | 101 |
| Decanol-1 | Kerosene | +0.130 | 146 | +0.152 | 164 |

It can be seen from the above table that the extraction efficiency increases with increased chain length until the octyl pyrophosphates are reached. With reduced acids in the volume ratio used, small errors in the analysis of uranium content cause large errors in the computed value of the extraction coefficients. However, there appears to be a slight decrease in the extraction efficiency of nonyl and decyl pyrophosphates, but the decrease is not significant.

Example III

The greatly increased extraction efficiency using extractants prepared in accordance with the invention are further illustrated by the following: A usual commercial synthesis was performed wherein one mole of $P_2O_5$ was added directly to two moles of octyl alcohol and the mixture stirred for 1 hour. The reaction temperature reached almost 120° C., the mixture was viscous and dissolution of the $P_2O_5$ was slow. Upon completion of the reaction the product was diluted to a 1% solution with kerosene. The efficiency of the diluted alkyl pyrophosphate in extracting uranium from phosphoric acid was then investigated by equilibration with commercial phosphoric acid as indicated above.

For comparison octyl pyrophosphoric acid was then prepared, in several inert organic diluents, using the method of the invention. The diluents used were hexane, diethyl ether and kerosene. For example, one mole of $P_2O_5$ was slurried in 1420 ml. of the selected solvent. Two moles of octanol were then added, with rapid stirring and the temperature maintained below 110° C. In the case where the reactants were diluted with hexane and diethyl ether, the diluents were evaporated under vacuum and the dioctyl pyrophosphoric acid product was diluted to a 1% solution with kerosene. Where the reactants were diluted with kerosene, the reaction solution was simply further diluted with kerosene to obtain the 1% solution. The extracting efficiency of the above solutions were then determined upon the same lot of phosphoric acid and under the same conditions as those used with the octyl pyrophosphoric acid prepared by the conventional method—with the results tabulated below. It will be readily observed, from an inspection of the table, that the pyrophosphates prepared with the use of an organic solvent possess extraction efficiency roughly double the efficiency of the pyrophosphate prepared by the conventional method.

| | Extraction from Reduced Acid | |
|---|---|---|
| | e.m.f. | $K_D$ |
| Conventional O.P.P.A. | 0.185 | 49 |
| Hexane Solvent | 0.185 | 80 |
| Diethyl Ether Solvent | 0.185 | 125 |
| Kerosene Solvent | 0.185 | 103 |

While in the forgoing examples there have been described what may be considered to be preferred embodiments of the invention, modifications may be made therein without departing from the spirit of the invention, and thus it is intended to cover all such as fall within the scope of the appended claims.

What is claimed is:

1. A process comprising mixing $P_2O_5$ with a first organic solvent-diluent to produce a slurry therewith, adding to said slurry an alcohol having a chain length in the range of 4 to 17 carbons atoms and at a mole ratio of 2:1 with respect to said $P_2O_5$ to react with said alcohol to produce a solution of said extractant compound having a final concentration below about 30% in said solvent, separating the alkyl pyrophosphate extractant compound from said first solvent, and then diluting said separated extractant compound with a second solvent to provide an extractant phase used in the extraction of metal values from an aqueous phase.

2. In a process for producing and utilizing an alkyl pyrophosphate extractant compound phase, the steps comprising mixing $P_2O_5$ with an organic solvent-diluent to produce a slurry therewith, adding to said slurry an alcohol having a chain length in the range of 4 to 17 carbon atoms and at a mole ratio of 2:1 with respect to said $P_2O_5$ to react with said alcohol to produce a solution of said extractant compound having a final concentration below about 30% in said solvent, storing said solution under refrigeration, and diluting said solution to the range of 0.10 to 20% to provide said extractant phase used in the extraction of metal values from an aqueous phase.

3. In a process for producing an alkyl pyrophosphate extractant compound phase, the steps comprising mixing $P_2O_5$ with an organic solvent-diluent selected from the group consisting of petroleum derived solvents, aromatic hydrocarbons, ethers, halogenated hydrocarbons and fluid aliphatic hydrocarbons to produce a slurry therewith, and adding to said slurry an alcohol having a chain length in the range of 4 to 17 carbon atoms and at a mole ratio of 2:1 with respect to said $P_2O_5$ to react with said alcohol to produce a solution of said extractant compound having a final concentration below about 30% in said solvent.

4. In a process for producing an alkyl pyrophosphate compound in a metal solvent extraction phase the steps comprising mixing finely divided solid $P_2O_5$ in an organic solvent-diluent selected from the group consisting of kerosene, benzene, chlorobenzene, toluene and hexane, agitating said $P_2$-O-solvent-diluent mixture whereby a slurry thereof is produced, rapidly adding an alcohol selected from the group consisting of hexanol-1, heptanol-3, octanol-1, octanol-2-, 2,6-dimethyl heptanol-4, and decanol-1 to said slurry in the amount of about 2 moles of alcohol to 1 mole of $P_2O_5$, reacting the $P_2O_5$ and alcohol in the slurry while the reaction temperature is maintained below 110° C., and thereby forming an alkyl pyrophosphate extractant compound in said solvent-diluent.

References Cited in the file of this patent

Beihringer: Ber. Dent. Chem. 38, 3974–3977 (1905).

Razukin et al.: Chem. Ztg. 47, 178 (1923), cited in Chemical Abstracts 17, 1912–1913 (1923).

Adler et al.: Chemical Industries 51, 516–521 (1942).

Kosolapoff: Organo Phosphorous Compounds, pages 220, 221 and 345 (1951), John Wiley & Sons, New York, N.Y.

Andressen et al.: "Recovery of Uranium From Superphosphate," U.S. Atomic Energy Commission, unclassified publication ISC–612, June 1955.

Bailes: "Recovery of Uranium From Ind. Phosphoric Acid," U.S.A.E.C., unclassified publication Dow 72, September 29, 1955.

Bailes: "Recovery of Uranium From Ind. Phosphoric Acid," U.S.A.E.C., unclassified publication Dow 74, September 29, 1955.

Bailes: "Recovery of Uranium From Ind. Phosphoric Acid," U.S.A.E.C., unclassified publication Dow 76, September 29, 1955.